United States Patent
Neelakantan et al.

(10) Patent No.: US 8,615,349 B2
(45) Date of Patent: Dec. 24, 2013

(54) METHOD OF DETECTING FILLING OF HYDRAULIC CLUTCH

(75) Inventors: Vijay A. Neelakantan, Rochester Hills, MI (US); Bret M. Olson, Whitelake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 877 days.

(21) Appl. No.: 12/616,706

(22) Filed: Nov. 11, 2009

(65) Prior Publication Data

US 2011/0112737 A1    May 12, 2011

(51) Int. Cl.
- *G06F 7/00* (2006.01)
- *G06F 17/00* (2006.01)
- *G06F 19/00* (2011.01)

(52) U.S. Cl.
USPC ............ 701/67; 701/30.5; 701/31.1; 477/70; 477/166; 477/174; 477/180

(58) Field of Classification Search
USPC ............ 701/67, 29.1, 30.5, 30.9, 31.1, 31.3; 192/3.51, 3.52, 3.54, 3.55, 3.57; 475/43, 86, 95, 100, 101, 103, 105, 475/108, 111, 116, 140, 238, 309, 315, 321, 475/327; 477/39, 57, 62, 70, 74, 77, 79, 86, 477/166, 171, 180
See application file for complete search history.

(56) References Cited

U.S. PATENT DOCUMENTS

| | | | |
|---|---|---|---|
| 5,643,123 A * | 7/1997 | Jang et al. | 475/119 |
| 5,853,076 A | 12/1998 | McKee et al. | |
| 6,205,875 B1 | 3/2001 | Eike et al. | |
| 6,640,950 B2 * | 11/2003 | Harvey et al. | 192/85.01 |
| 7,440,833 B2 * | 10/2008 | Chen | 701/51 |
| 2004/0157702 A1* | 8/2004 | Nakagawa et al. | 477/70 |
| 2008/0228340 A1* | 9/2008 | Rains et al. | 701/29 |
| 2009/0013810 A1* | 1/2009 | Nakagawa et al. | 74/335 |
| 2009/0111642 A1* | 4/2009 | Sah et al. | 477/5 |
| 2009/0125201 A1* | 5/2009 | Leibbrandt et al. | 701/67 |
| 2009/0159389 A1* | 6/2009 | Imediegwu | 192/3.58 |
| 2009/0209392 A1* | 8/2009 | Stepper et al. | 477/174 |
| 2010/0016119 A1* | 1/2010 | Petzold et al. | 477/70 |

* cited by examiner

*Primary Examiner* — Rami Khatib

(57) ABSTRACT

A method of detecting filling of a hydraulic cylinder and incipient full engagement of a hydraulically operated clutch of a vehicular transmission utilizes a pressure sensor disposed in a hydraulic line to the clutch cylinder which provides a signal that the hydraulic pressure has dropped as the clutch cylinder begins to fill and also that the pressure has returned to a substantially normal level. The pressure sensor may be a continuously variable output device such as an analog sensor, pulse width modulation (PWM) sensor, a similar device or, less desirably, a two state sensor. An iterative algorithm utilizes data from the sensor and a timer to determine when clutch fill is complete.

19 Claims, 3 Drawing Sheets

METHOD OF DETECTING FILLING OF HYDRAULIC CLUTCH

FIELD

The present disclosure relates to an operating method for a hydraulic clutch and more particularly a method of detecting completion of filling of a hydraulic clutch in a vehicle transmission.

BACKGROUND

The statements in this section merely provide background information related to the present disclosure and may or may not constitute prior art.

In many automatic transmissions, hydraulic piston and cylinder assemblies engage and disengage clutches to achieve a desired power flow path corresponding to a desired gear ratio or speed, typically in a sequence of gear ratios or speeds. Such operation occurs in both clutch-to-clutch (multiple planetary) and dual clutch (DCT) transmissions.

In such transmissions, the smoothness and overall quality of a shift is primarily determined by the characteristics of clutch engagement, for example, how quickly clutch engagement begins after a clutch engagement command and how rapidly the clutch engages. Such clutch engagement characteristics are, in turn, the product of hydraulic fluid application, that is, the pressure of fluid application, the volume of fluid application and the duration and time based function of these application characteristics.

In these transmissions, it is often desirable to know the status of hydraulic clutches, especially as filling nears completion when the hydraulic pressure on the clutch can be controlled to achieve controlled and optimum clutch engagement.

In such transmissions, if clutch pressure control is begun when the hydraulic chamber of the clutch is not fully filled with transmission oil, it may result in engine flare when the engine speed rises suddenly due to lack of load. Similarly, when the clutch fill phase is extended for longer than necessary, sudden, uncontrolled engagement of the clutch may result and cause a bumpy gear shift or a transmission tie-up. Hence, it is important to monitor clutch fill pressure and fill the clutch chamber exactly as appropriate and than continue to the next phase to maintain shift quality and increase reliability on clutch materials.

The present invention is directed to a method of detecting substantial filling of a hydraulic cylinder of a hydraulically operated clutch of a vehicular automatic transmission.

SUMMARY

The present invention provides a method of detecting substantial filling of a hydraulic cylinder and incipient full engagement of a hydraulically operated clutch of a vehicular automatic transmission. Because hydraulic pumps in automatic transmissions are sized to provide and satisfy an average or nominal flow, when certain large flow events occur, such as filling of a clutch cylinder, hydraulic pump pressure may drop temporarily and rebound as the clutch cylinder fills and the clutch nears its travel limit. In hydraulic systems where this occurs, the pressure/time relationship in a supply line may be measured and utilized to anticipate clutch filling and thus pressure control and full engagement of the clutch can be carried out.

A pressure sensor disposed in the main hydraulic line or in a location that is being fed by the main line such as another fully applied (on) holding clutch in the transmission of the control system provides a signal, first that the main line or supply hydraulic pressure from the pump has dropped as the clutch cylinder begins to fill and second, that the pressure has returned to a substantially normal level. The pressure sensor may be a continuously variable output such as an analog sensor, pulse width modulation (PWM) sensor, simple switch or similar device. An iterative algorithm utilizes data from the sensor and a timer to determine when clutch fill is substantially complete. Depending upon pump delivery flow rates and pressures, clutch cylinder size and operating pressure, flow rates and restrictions between the pump and the cylinder and proper selection of predetermined values in the algorithm, the method provides an indication that the clutch cylinder is substantially full of oil and that the pressure control can be carried out at the clutch Thus it is an object of the present invention to provide a method of determining the incipient end of fill phase of a hydraulic clutch.

It is a further object of the present invention to utilize a pressure sensor in a hydraulic line in the control system to determine the incipient end of fill phase of the clutch.

It is a still further object of the present invention to provide a method of sensing hydraulic pressure supplied to a hydraulic clutch cylinder to indicate incipient end of fill phase of the clutch.

Further objects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
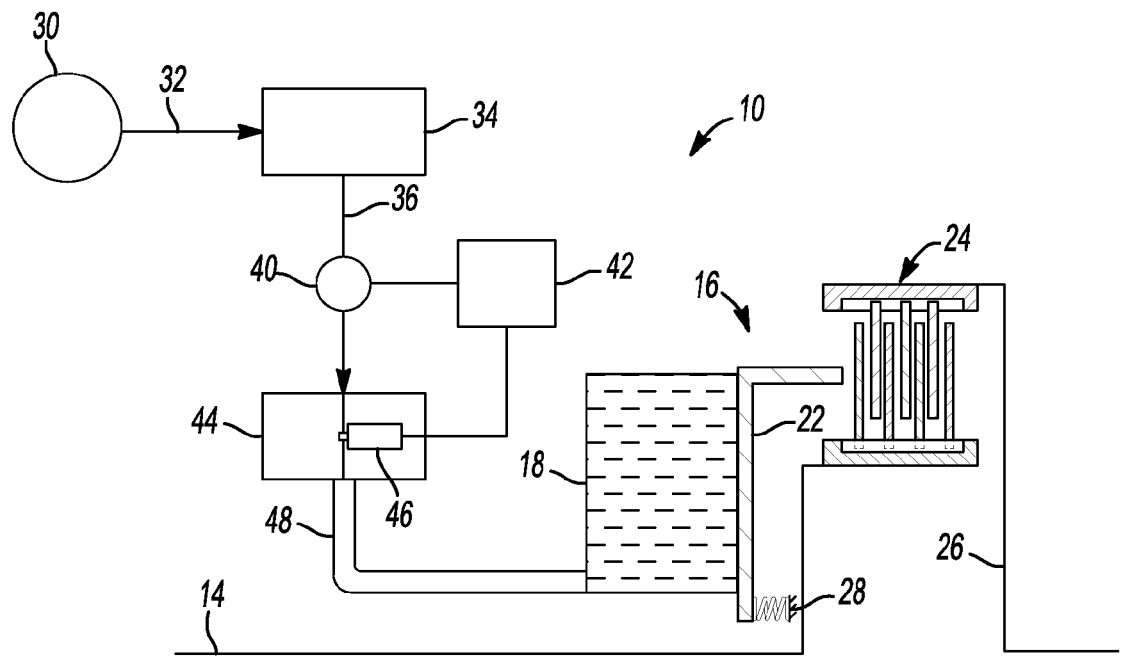
FIG. 1 is a schematic view of a portion of a transmission having a hydraulically operated clutch and pressure sensor according to the present invention.

With reference to FIG. 1, a portion of an automatic transmission incorporating the present invention is illustrated and generally designated by the reference number 10. The automatic transmission 10 includes a rotatable input shaft 14 which provides drive torque to a clutch assembly 16 from a prime mover (not illustrated) such as a gas, Diesel, flex fuel, hybrid or electric power plant. It should be understood that the clutch assembly 16 is representative only and that, typically, multiple clutches will be utilized in a transmission and that the clutch locations may be at the input to the transmission, within the transmission or both. The clutch assembly 16 includes a hydraulic cylinder 18 which receives a bi-directionally slidable hydraulic apply piston 22. The hydraulic apply piston 22 acts upon and compresses or releases an associated friction clutch pack 24 which selectively transfers drive torque from the input shaft 14 to a drive shaft or output member 26 and, in turn, to components within the transmission 10. The clutch pack 24 may also contain wave plates (not illustrated) that provide variable stiffness properties to the clutch pack 24 along with the clutch plates. Typically, the clutch assembly 16 will also include a return spring 28 which acts upon the apply piston 22 to assist release of the friction clutch pack 24 when hydraulic pressure to the hydraulic cylinder is removed or lowered.

The transmission 10 includes a hydraulic pump 30 that may be driven directly (or indirectly through a geared connection) from the input shaft 14, the output shaft of the prime mover or may be driven independently by a dedicated electric motor (not illustrated). The hydraulic pump 30 provides pressurized hydraulic fluid (transmission oil) to an outlet or supply line 32 that communicates with a line pressure control system 34 (LPCS) which may include various electromechanical devices such as solenoid control valves and pressure regulators. In fluid communication with the output of the line pressure control system 34 is a fluid supply line 36 which is connected to a line pressure sensor 40 having an output which corresponds to the instantaneous hydraulic fluid pressure in the fluid supply line 36. It should be apparent that the sensor 40 may also be disposed in other locations such as a fully applied clutch as long as it is capable of monitoring or measuring variations in the main supply pressure. The fluid pressure sensor 40 is preferably a proportional device having, for example, a continuously or intermittently variable output such as an analog, pulse width modulation (PWM) or similar output which is supplied to, for example, a transmission control module (TCM) 42 or similar device. Electronic conditioning, scaling and temperature compensating circuitry, if desired, may be included within the transmission control module 42. Alternatively, the output of the fluid pressure sensor 40 may be provided directly to a clutch pressure control system (CPCS) 44.

From the fluid pressure sensor 40, the fluid supply line 36 is connected to and supplies hydraulic fluid to a clutch pressure control system 44. The clutch pressure control system 44 preferably includes, for example, one or more proportioning or variable bleed (VBS) solenoid valves along with pressure regulator valves or variable force solenoid valves (VFS) or similar devices shown as 46 which allows control of the flow and pressure of hydraulic fluid provided to a hydraulic line 48 which communicates with the hydraulic cylinder 18 of the clutch assembly 16. The clutch pressure control system 44 may also include a microprocessor and related electronic components. Typically, the clutch pressure control system 44 will operate in conjunction with and receive data and commands from the transmission control module (TCM) 42.

Figure 2:
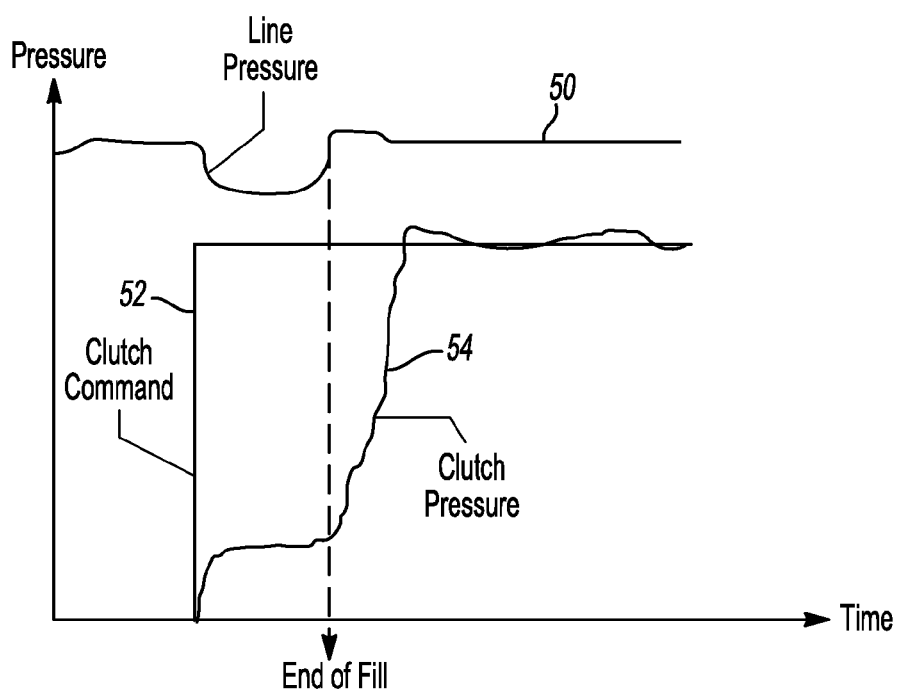
FIG. 2 is a graph of hydraulic clutch line pressure and clutch engagement versus time of a typical hydraulically operated clutch.

Referring now to FIGS. 1 and 2, a diagram showing the performance of a typical hydraulic supply system of a transmission, such as the transmission 10 during a clutch fill cycle and engagement cycle, is presented. The horizontal (X) axis represents time and the vertical (Y) axis represents different hydraulic fluid pressures in the system. The upper, irregular horizontal line 50 represents and indicates the instantaneous hydraulic pressure in the fluid supply line 36 as sensed by the fluid pressure sensor 40. Moving to the right across the diagram, the vertical event line 52 represents the desired pressure command to the clutch pressure control system 44 from the transmission control module (TCM) 42 or similar device to engage the clutch assembly 16 by filling the cylinder 18 and translating the piston 22. The upwardly moving, irregular line 54 represents the actual pressure within the clutch cylinder 18.

After the start of the desired clutch pressure command 52, there is a lot of flow demand at the clutch assembly 16 when the fluid from the line pressure system 36 flows into the clutch cylinder 18 through the hydraulic line 48 to begin stroking the clutch piston 22. During this time, the actual pressure at the clutch cylinder 18 follows a low pressure value that depends on the stiffness of the return spring 28 and the apply area of the piston 22. When the clutch piston 22 nears the end of its stroke, it is in full contact with the clutch pack 24 and the gap between the plates of the friction pack 24 is reduced to a minimum. At this point, the flow demand reduces as the clutch assembly 16 has completed stroking the piston 22 and the clutch fill phase is completed. Then, with the command pressure 52 being the same, the pressure at the clutch 54 begins to rise quickly as controlled by the control system 44 and finally settles down around the value of 52.

During the clutch fill process, the relationship between the lines 50 and 54 should be noted. During the clutch fill phase, the pump 30 which is usually flow limited, will be unable to maintain the same line pressure and the high flow requirement at the same time. As a result, there is a temporary drop in system line pressure 50 during the clutch fill phase. As this initial volume flow into the clutch cylinder 18 subsides at the end of the clutch fill phase and the pressure begins to build toward full clutch engagement pressure, the line pressure sensed by the pressure sensor 40 begins to return to a nominal, operating pressure. This return to the nominal operating pressure precedes full pressure in the clutch cylinder 18 and full engagement of the friction clutch pack 24 of the clutch assembly 16.

Figure 3:
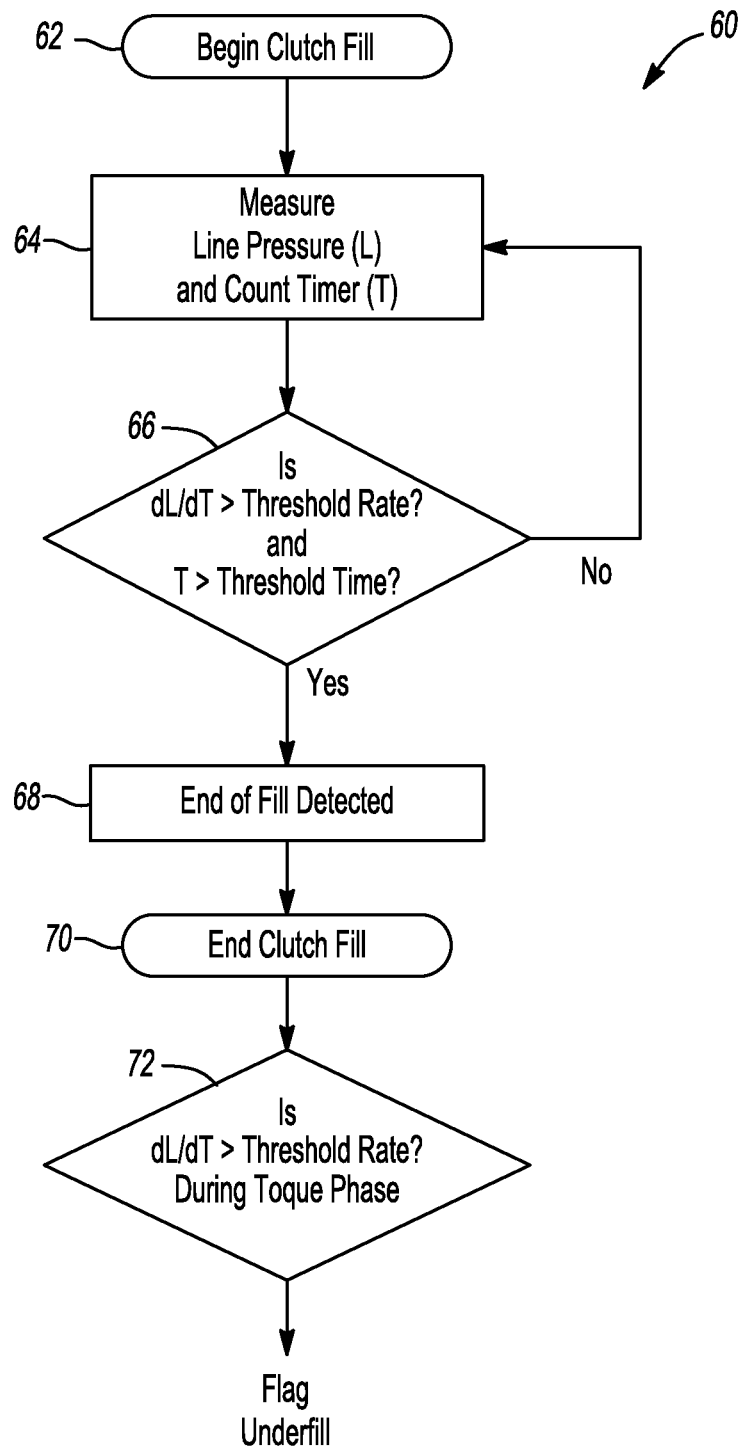
FIG. 3 is a flow chart of the method of determining hydraulic clutch fill according to the present invention.

Referring now to FIGS. 1 and 3, an algorithm which can be embodied in the software of a microprocessor of the transmission control module 42 or the clutch pressure control system 44 is illustrated and designated by the reference number 60. The software algorithm 60 begins with a start or initializing step 62 which is commenced upon a clutch fill command or instruction from the transmission control module 42 or similar device. The start or initializing step 62 will typically undertake such sub-steps as clearing arithmetic registers and resetting counters to zero or other desired initial values. The software 60 then moves to a process step 64 which measures the line pressure (L) from the pressure sensor 40 and the current time value (T) from an elapsed time counter which was reset to zero in the initializing step 62. With this current data measured and stored in temporary registers, the algorithm 60 moves to a decision point 66 which undertakes a calculation and a two step interrogation. First of all, the decision point 66 computes the derivative dL/dT from the data measured and stored in the preceding step and determines whether it is less than a first predetermined or preset threshold rate of change. The derivative dL/dT can be calculated by one of many possible methods. The predetermined rate of change will depend upon the flow rate and pressure characteristics of the hydraulic pump 30, the volume and nominal fill rate of the hydraulic cylinder 18 of the clutch assembly 16 and transmission and clutch operational characteristics and performance considerations. It may be selected empirically, arrived at experimentally or determined through other means and methods.

The decision point 66 also interrogates the count timer and determines whether the current time T has exceeded or is greater than a second predetermined or preset threshold time. Once again, the predetermined or preset threshold time value will depend both upon the hydraulic and mechanical operating characteristics of the pump 30 and the clutch assembly 16 as well as the operational and desired performance characteristics of the transmission 10. These interrogations are combined using an AND operation and if one or both are not true, the decision point 66 is exited at NO and the algorithm 60 loops back to the process step 64 where new values of the line pressure L and the timer count T are measured and stored.

If both conditions are satisfied, i.e., the rate of change of dL/dT is less than the predetermined rate and T is greater than the predetermined threshold time, the decision point 66 is exited at YES and a process step 68 is entered which provides a signal or indication or achieves a state indicating to associated circuitry or devices that the end of clutch fill has been detected. The algorithm 60 then concludes at an end step 70. Associated with this end step 70 is a diagnostic decision point 72 which inquires whether dL/dT is greater that the first predetermined or preset rate utilized above during the torque phase of operation of the transmission 10, where the torque phase is the subsequent phase of clutch engagement after the clutch fill phase in a typical upshift. If it is, the diagnostic decision point 72 is exited at YES which sets a flag indicating a clutch underfill. If it is not, the diagnostic decision point 72 is exited at NO and no action is taken.

An alternate for monitoring the threshold rate could also be understanding and characterizing the drop in pressure expected during a fill phase. In this case, the entrance and exit of fill can be simply characterized by a threshold pressure or a characteristic drop in pressure.

Figure 4:
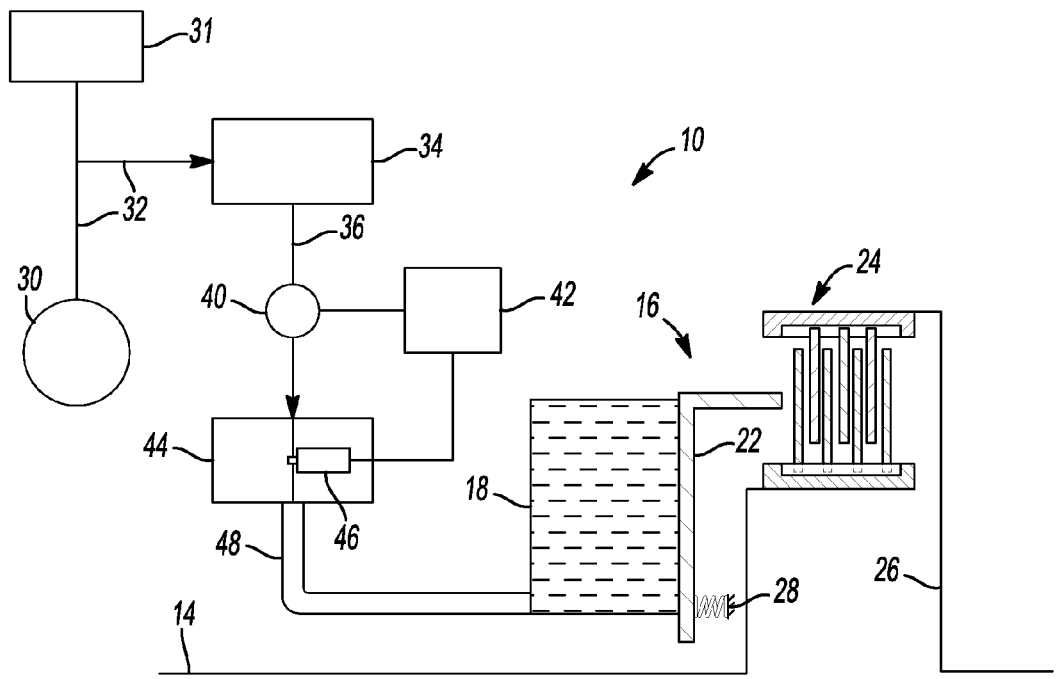
FIG. 4 is a schematic view of a portion of a transmission having an accumulator, a hydraulically operated clutch and pressure sensor according to the present invention.

Referring now to FIG. 4, it should be apparent to those skilled in the art that the pump and the line pressure regulator can be replaced by an accumulator fed by a hydraulic source and that very similar strategies of determining the end of fill can be employed. FIG. 4 is essentially the same as FIG. 1, wherein the portion of the transmission 10 includes the shafts 14 and 26, the clutch assembly 16, the pump 30 and all the other components therein illustrated, the above descriptions being incorporated herein by reference. Additionally, an accumulator 31 is disposed in fluid communication with the outlet or supply line 32. The accumulator 31 stores and provides a volume of hydraulic fluid under system pressure. During a fill phase, the accumulator 31 will show distinctly different rate of discharge during a clutch fill compared to the natural leakage of the system. Using similar methodologies and sensors, these changes in rates can be observed with a line pressure sensor 40 and the end of fill can be learned.

Figure 5:
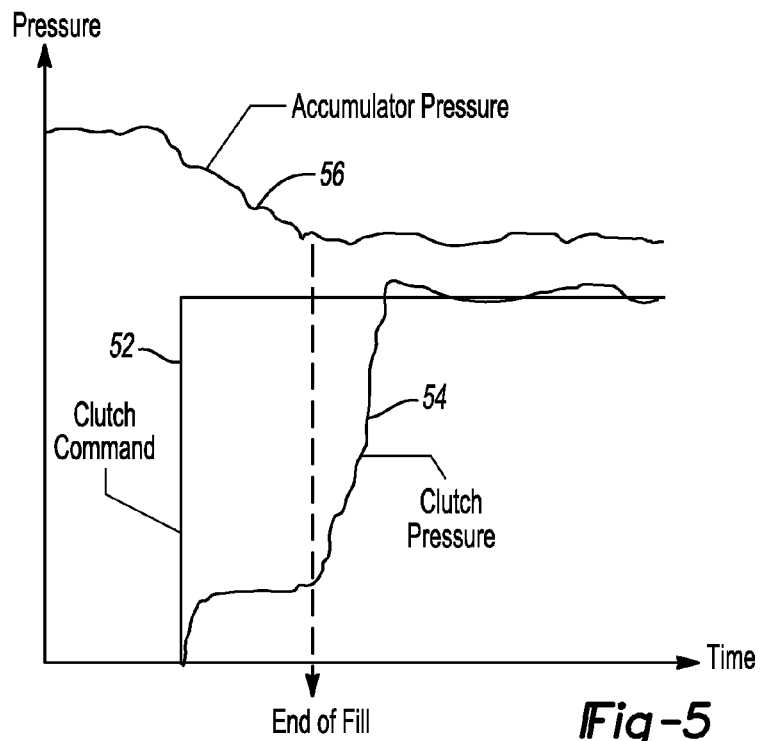
FIG. 5 is a graph of hydraulic clutch line pressure and clutch engagement versus time of a typical hydraulically operated clutch being fed by an accumulator.

Referring now to FIG. 5, which is similar to FIG. 2 but relates to operation of the system with the accumulator 31 illustrated in FIG. 4. Once again, the horizontal (X) axis represents time and the vertical (Y) axis represents different hydraulic fluid pressures in the system. The upper, irregular line 56 represents and indicates the instantaneous hydraulic pressure in the fluid supply line 32 at the inlet/outlet of the accumulator 31. The vertical event line 52 represents the clutch command to the clutch pressure control system 44 from the transmission control module (TCM) 42 or similar device to engage the clutch assembly 16 by filling the cylinder 18 and translating the piston 22. The upwardly moving, irregular line 54 represents the actual pressure within the clutch cylinder 18. It will be appreciated that as the clutch cylinder 18 is filling, the pressure at the accumulator 31 is dropping and at the end of clutch fill, the pressure within the cylinder 18 begins to build while the pressure at the accumulator 31 stabilizes.

It will thus be appreciated that the present invention provides a method of detecting and providing a signal or indication to, for example, a transmission control module or other componentry associated with a vehicular automatic transmission or the powertrain, that a hydraulic fluid clutch is substantially or essentially fully filled and that friction coupling and torque throughput is approaching its full operational value. This information is highly useful for the control systems of such transmissions, facilitating achievement of rapid, smooth and energy efficient gear shifts.

The description of the invention is merely exemplary in nature and variations that do not depart from the gist of the invention are intended to be within the scope of the invention. Such variations are not to be regarded as a departure from the spirit and scope of the invention.

What is claimed is:

1. A method of determining engagement of a friction clutch in a transmission comprising the steps of:
    providing a source of pressurized hydraulic fluid, a control valve, a proportional pressure sensor, a timer and a hydraulic clutch having a cylinder,
    providing a flow of pressurized fluid through said control valve to said clutch cylinder,
    sensing hydraulic fluid pressure supplied to said clutch cylinder per unit of time,
    determining when a change in said pressure per unit of time is less than a first predetermined value and said timer has timed a period greater than a second predetermined time, and
    providing a signal that said cylinder of said hydraulic clutch is filled and said clutch is engaged.

2. The method of determining of claim 1 wherein said flow of pressurized fluid is provided by opening said valve.

3. The method of determining of claim 1 wherein said signal is provided to a transmission control module.

4. The method of determining of claim 1 wherein said determining step is repeated until said change and said time conditions are satisfied.

5. The method of determining of claim 1 further including the step of determining if a time rate of change in said pressure is greater than said first predetermined value during a torque phase of operation.

6. The method of determining of claim 1 wherein said hydraulic clutch provides torque to a portion of an automatic transmission.

7. The method of determining of claim 1 wherein said source of pressurized hydraulic fluid is a pump driven by one of an input shaft of a transmission, an output shaft of a prime mover and an electric motor.

8. A method of determining achievement of a filled state of a hydraulic clutch in a transmission, comprising the steps of:
    providing a hydraulic pump, a hydraulic clutch having a cylinder, a fluid path providing communication between said pump and said cylinder and a valve for controlling fluid flow in said path such that opening said valve to fill said cylinder causes a reduction in fluid pressure in said path,
    providing a timer and a proportional pressure sensor in said path having an output,
    opening said valve,
    sensing hydraulic fluid pressure supplied to said hydraulic clutch cylinder per unit of time,
    determining when a change in said pressure per unit of time is less than a first predetermined value and said timer has timed a period greater than a second predetermined time, and
    providing an indication that said hydraulic clutch cylinder is filled and said clutch is engaged.

9. The method of determining of claim 8 wherein said indication is provided to a transmission control module.

10. The method of determining of claim 8 wherein said determining step is repeated until said change and said time conditions are satisfied.

11. The method of determining of claim 8 further including the step of determining if a change in said pressure per said unit of time is greater than said first predetermined value during a torque phase of operation.

12. The method of determining of claim 8 wherein said hydraulic clutch provides torque to a portion of a dual clutch transmission.

13. The method of determining of claim 8 wherein said transmission is a dual clutch transmission and includes two of said hydraulic clutches, said fluid paths and said valves.

14. A method of determining a full state of a cylinder of a hydraulic friction clutch in a transmission, comprising the steps of:
   providing a hydraulic pump and a hydraulic friction clutch having a cylinder,
   providing a fluid communication passageway between said pump and said cylinder and a fluid control valve for controlling fluid flow in said passageway,
   providing a proportional pressure sensor for monitoring fluid pressure in said passageway between said valve and said cylinder and having an output and a timer for determining time elapsed after said fluid control valve is opened,
   sensing hydraulic fluid pressure in said fluid communication passageway per unit of time,
   determining when a derivative of said pressure per said unit of time is less than a first predetermined value and said timer has timed a period greater than a second predetermined time, and
   providing a signal that said hydraulic clutch cylinder is filled and said clutch is engaged.

15. The method of determining of claim 14 wherein said signal is provided to a transmission control module.

16. The method of determining of claim 14 wherein said determining step is repeated until said derivative and said time conditions are satisfied.

17. The method of determining of claim 14 further including the step of determining if a change in said pressure per said unit of time is greater than said first predetermined value during a torque phase of operation.

18. The method of determining of claim 14 wherein said hydraulic friction clutch provides torque to a portion of a dual clutch transmission.

19. The method of determining of claim 14 further including the step of providing an accumulator in said fluid communication passageway between said pump and said cylinder.

\* \* \* \* \*